United States Patent [19]

Lieser

[11] Patent Number: 4,629,375

[45] Date of Patent: Dec. 16, 1986

[54] CHUCK FOR TOOL SHANKS, PARTICULARLY SCREWDRIVER BITS

[75] Inventor: Karl Lieser, Wuppertal, Fed. Rep. of Germany

[73] Assignee: Wera Werk Hermann Werner GmbH & Co., Wuppertal, Fed. Rep. of Germany

[21] Appl. No.: 642,027

[22] Filed: Aug. 20, 1984

[30] Foreign Application Priority Data

Aug. 24, 1983 [DE] Fed. Rep. of Germany ....... 3330486

[51] Int. Cl.$^4$ .............................................. B23B 31/22

[52] U.S. Cl. ................................ 408/239 R; 279/1 B; 279/75; 279/82

[58] Field of Search ...................... 279/1 B, 22, 75, 82, 279/30, 37, 43, 50, 57, 74; 408/56, 239 R, 239 A, 240

[56] References Cited

U.S. PATENT DOCUMENTS

| | | | |
|---|---|---|---|
| 3,185,493 | 5/1965 | Chadwick | 279/82 |
| 3,927,893 | 12/1975 | Dillion et al. | 279/82 X |
| 4,107,949 | 8/1978 | Wanner et al. | 279/1 B X |
| 4,197,886 | 4/1980 | MacDonald | 408/56 X |

*Primary Examiner*—Gil Weidenfeld
*Assistant Examiner*—Glenn L. Webb
*Attorney, Agent, or Firm*—Martin A. Farber

[57] ABSTRACT

A chuck for non-circular ends of tool shanks having a bushing forming a chamber corresponding in cross-section to the tool shank and a ball which acts on the shank and is clamped by a spring biased sleeve which forms a wedge against the ball. The ball is mounted in a separate wing which is engaged by the sleeve and is displaceable relative to the bushing so that the ball engages a clamping surface formed by an end ring and the tool shank in a clamping position.

20 Claims, 5 Drawing Figures

CHUCK FOR TOOL SHANKS, PARTICULARLY SCREWDRIVER BITS

FIELD AND BACKGROUND OF THE INVENTION

The invention relates to a chuck for non-circular ends of tool shanks, particularly screwdriver bits. The inventions provides such a chuck which has a bushing whose chamber corresponds to the non-circular cross section of the tool shank end and a ball which acts on the shank and is associated with a sleeve which is displaceable against spring action, the association of the ball with the sleeve being such that a clamping surface, which narrows down in wedge-shape towards the shank-receiving end of the chuck presses against the ball, in which connection the sleeve is displaceable in the direction of insertion of the shank for passage into a release position, the ball being received in a protruding wing, and the clamping surface being on the inner wall of an end ring which surrounds the edge of the bushing and the wing.

The advantages of this reside essentially in the fact that, upon displacement of the sleeve, the chuck will not be moved out of the drilling machine even in case of an insufficiently firm seat of the chuck in the holder. In one embodiment, the wing in one piece with the sleeve. Since the wing corresponds to a segment forming the non-circular cross section of the bushing, the sleeve can be displaced only in the longitudinal direction of the chuck (DE OS No. 32 43 389).

The object of the present invention is to provide and improve a chuck of this type in the manner that, for the same size, a greater torque can be transmitted, with improved adjustment and handling.

SUMMARY OF THE INVENTION

The invention is achieved in the manner that a wing with a protruding ball therein and a sleeve are developed in two parts and, on the side of the wing away from the sleeve, a bushing is provided which has an annular region. This annular region is continuous in cross section and is surrounded by an end ring.

As a result of this development, a chuck is obtained which is characterized, on the one hand, by a stronger structural form and, on the other hand, by improved handling. The stronger structural form results from the fact that the bushing is closed on the other side of the recess in it which receives the wing, forming the continuous annular region which is surrounded by an end ring. The chuck can therefore transfer higher torques without danger. Furthermore, the surface of action and attachment for the end ring is increased at the annular region thereof, obtaining an improved seat of said ring on the bushing. Since the wing and the sleeve are now developed in two parts, the sleeve can turn relative to the bushing. This results in advantages upon the adjustment and therefore upon the placing of the screwdriver bit on a screw, since the sleeve can be held with one hand while the bushing, with the screwdriver bit seated in it, rotates.

One advantageous improvement resides in the fact that the inner wall of the annular region of the bushing is of polygonal shape in correct angular relationship to the polygonal surfaces of the chamber in the bushing. The polygonal surfaces of the bushing, which accordingly extend up into the annular region, lead to a stable seat of the screwdriver bit in the bushing itself.

Finally, it has also been found advantageous for the wing to have an outwardly directed tang or flange, which grips over an inwardly directed shoulder of the sleeve and forms a part of the support surface for a sleeve spring. Upon the displacement of the sleeve in order to release the inserted screwdriver bit, the shoulder carries the tang and thus the wing along with it, the ball entering into a position of release. After the sleeve is released, the sleeve spring brings the sleeve and the wing back into the basic holding position. Assembly can be effected in very simple fashion. The sleeve spring is, first of all, pushed onto the bushing. The wing is then inserted into the recess of the bushing in such a manner that a part of the sleeve spring rests against the outwardly directed tang of the wing. The sleeve is pushed thereon over the wing and part of the bushing, and the end ring is brought into a force fit on the bushing.

BRIEF DESCRIPTION OF THE DRAWINGS

One embodiment of the invention will be described below with reference to FIGS. 1 to 5 of the drawing, in which.

DETAILED DESCRIPTION OF THE PREFERRED EMBODIMENT

Figure 2:
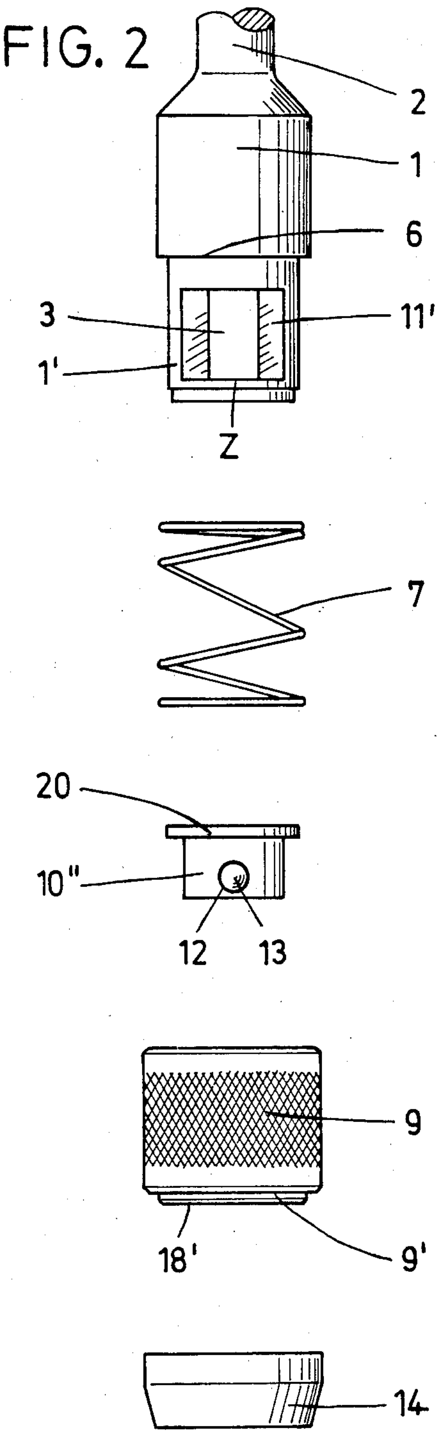
FIG. 2 shows the individual part of the chuck in exploded view.
Figure 1:
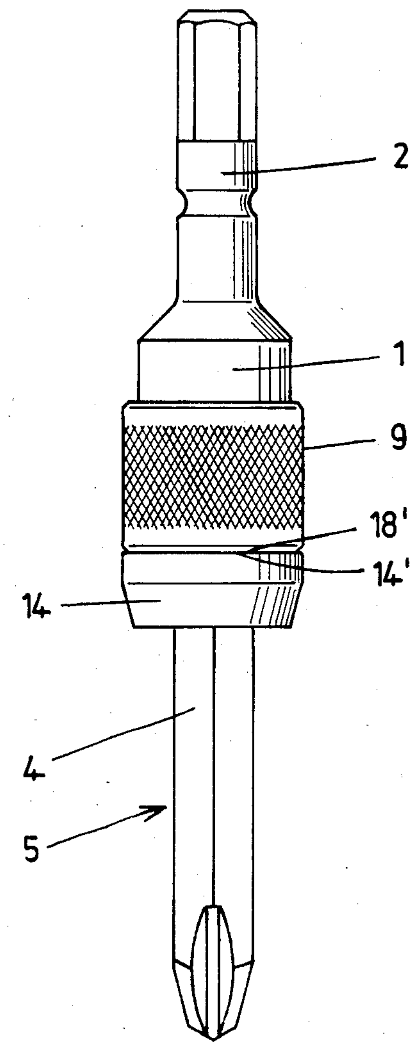
FIG. 1 is a view of a chuck containing a screwdriver bit, shown on a large scale.
Figure 3:
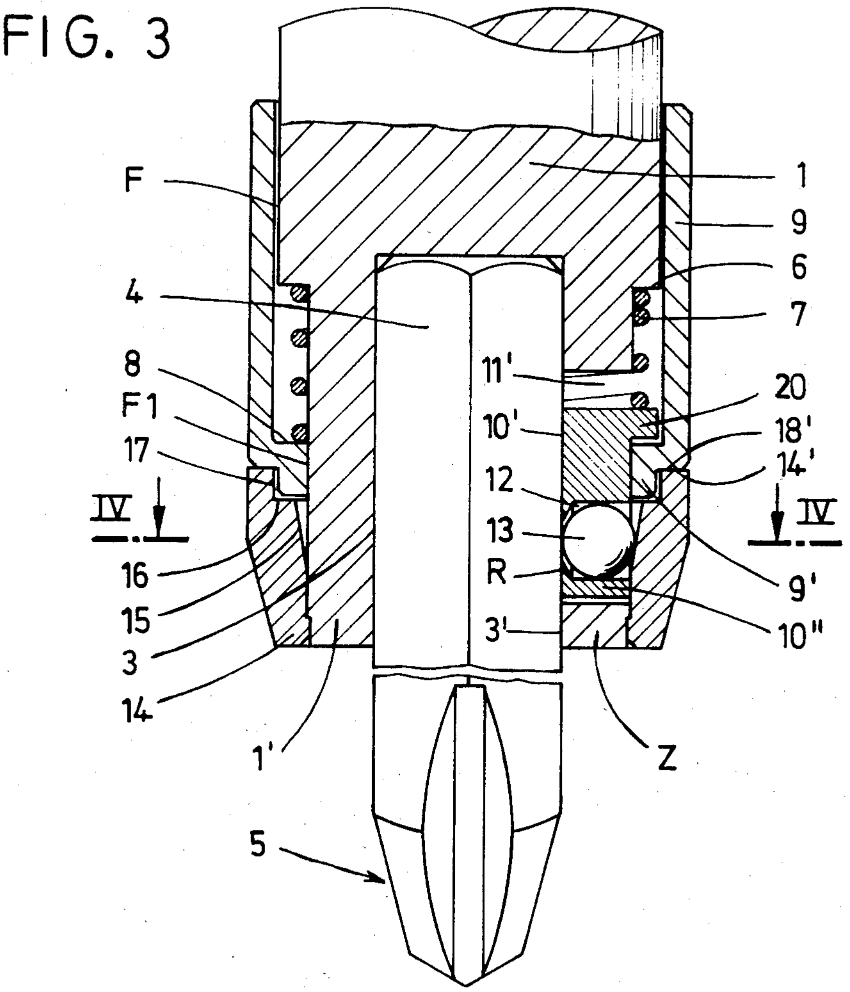
FIG. 3 is a longitudinal section through the chuck with a screwdriver bit inserted, shown on a greatly enlarged scale.

The chuck has a bushing 1 which is developed at its upper end as a chucking shaft 2. A chamber 3 of non-circular cross section is formed in the bushing 1 from its free end 1'. In the present case, the chamber has a hexagonal cross section which corresponds to the cross section of the shank 4 of an exemplary screwdriver bit 5. The latter in this example is a screwdriver bit for Phillips screws.

That end 1' of the bushing 1 which is remote from the chucking shaft 2 is developed in stepped-down shape. Hence there is produced a shoulder 6 against which one end of a coil compression spring 7 rests seated around the bushing end 1'. A part of the other end of said spring rests against an inwardly directed shoulder 8 on a sleeve 9, which sleeve is arranged for both longitudinal displacement and rotation on the bushing 1. The remaining support surface for this other end of the coil compression spring 7 is formed by an outwardly directed tang 20 of a wing 10'', which tang is interposed thereat between said pring and said shoulder 8 and thus comes against the shoulder 8 as a result of spring load. The shoulder connects two guide surfaces F and F 1 of different size of the sleeve 9. The one guide surface F 1 slides on the stepped-down end 1' of the bushing while the other guide sleeve F surrounds the part of the bushing of larger cross section.

Figure 4:
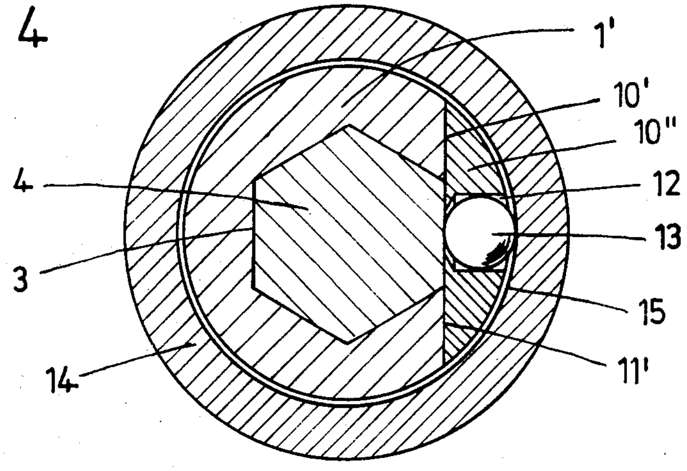
FIG. 4 is a section along the line IV—IV of FIG. 3.

The wing 10'' which is coupled to the sleeve 9 at shoulder 8 is of segmental or partial hemispherical cross-sectional shape in such a manner that its inner flat surface 10' is aligned as a side wall of the chamber 3 in bushing 1. In order to make this possible, the end 1' of the bushing 1 is provided with a recess 11' so that the wing 10" together with the remaining cross section of the end 1' located at the same height forms a circular shape; see FIG. 4. The height of the recess 11' is greater than the height of the wing 10". The recess 11', however, terminates at a distance in front of the free edge of the end 1' so that the bushing forms an annular region Z of continuous cross section on the other side of the wing 10".

Within the wing 10" there is a mounting hole 12, arranged transverse to the longitudinal direction of the sleeve 9, in order to receive a ball 13. The diameter of the ball 13 is, in this connection, greater than the thickness of the wing 10" in radial direction. The ball 13 is prevented from falling out of the mounting hole 12 by an inward-directed edge R. Assurance is had, however, that the ball 13 has sufficient play in radial direction.

The inner wall 3' of the annular region Z is of polygonal shape, namely in correct angular position with respect to the polygonal surfaces of the chamber 3 so that in this way increased resting surface for the shank 4 of the screwdriver bit 5 is also assured.

Both the annular region Z of the bushing 1 and the wing 10" are surrounded by an end ring 14. The latter is arranged in a force fit on the annular region Z and the adjacent region of the end 1' in such a manner that the wing 10" is not included in this force fit but retains its freedom of movement.

The end ring 14 forms an inner clamping surface 15 which narrows in wedge shape towards the free end and by virtue of which narrowing presses against the ball 13. The clamping surface 15 continues via a step 16 into a hollow 17 which is adapted to the outer circumference of a stepped free end 9' of the sleeve 9, assuring the freedom of movement of the sleeve 9.

If a screwdriver bit 5 is present in the chamber 3 then it will be held in position in the manner that the coil compression spring 7 displaces the wing 10", together with sleeve, opposite the direction of insertion of the screwdriver bit. In this connection the ball 13 rests against the clamping surface 15 of the end ring 14 and is moved in radial inward direction, exerting a pressure on the shaft 4 of the screwdriver bit 5. If a tensile force occurs on the latter the clamping force is increased.

Figure 5:
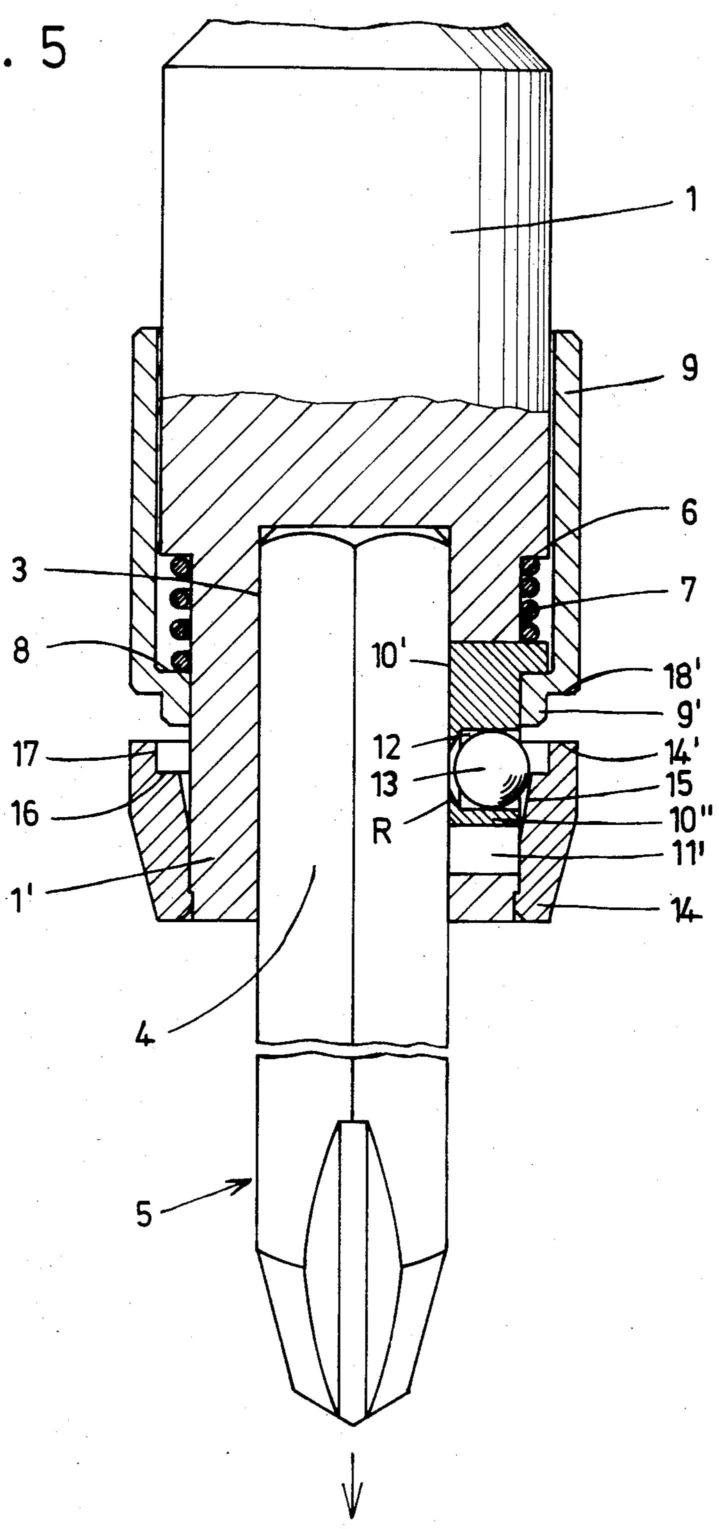
FIG. 5 corresponds to FIG. 3, but with the sleeve in the release position.

In order to remove the screwdriver bit 5 it is necessary to displace the peripherally knurled sleeve 9 in the direction of bit insertion against the spring force. Due to this, the shoulder 8 of the sleeve 9 strikes against the tang 20 of the wing 10" and carries the latter along, including the ball 13 present in it, the ball then passing out of the clamping position between clamping surface 15 and shank 4; see FIG. 5. The screwdriver bit 5 can then easily be removed. When the screwdriver bit 5 has been removed, the compression spring 7 moves the sleeve, together with wing 10", back into the basic position, the step 18' of the sleeve 9 coming against the upper end edge 14' of the end ring 14. The tang 20 then strikes against the shoulder 8.

As the screwdriver bit 5 is inserted, the wing can be displaced by a certain amount within the recess 11' in the direction of the annular region Z, obtaining a subsequent tightening action between the shank 4, the ball 13 and the clamping surface 15. With the screwdriver bit inserted, the tang 20 is accordingly located a slight distance above shoulder 8.

I claim:

1. A chuck for non-circular ends of tool shanks, particularly screwdriver bits, comprising a bushing, said bushing forming a chamber corresponding in cross-section to that of said non-circular ends of the tool shanks respectively removably insertable therein, said bushing having a free end having an edge, a spring-biased sleeve displaceably mounted on said bushing in a direction of insertion of said shanks against spring-action for movement into a release position, a wing operatively engageable with said sleeve and displaceably mounted with respect to said bushing so as to be moveable in the direction of insertion of said shanks against the spring-action for movement into the release position, a ball mounted in said wing, said free end of said bushing on a side of the wing opposite said sleeve forms an annular region of continuous cross-section, an end ring attached to said bushing surrounding said edge of said bushing, said wing, and said annular region, said end ring has an inner wall and a clamping surface which narrows down in wedge-shape towards said free end of the bushing on the inner wall of said ring, said ball operatively engaging said clamping surface and a respective of said shanks inserted in said chamber in a clamping position, said wing and said sleeve are two separate parts.

2. The chuck of claim 1, further comprising a spring acting against said sleeve and said wing for displacing said sleeve and said wing into the clamping position with said ball pressing against said respective shank and said clamping surface.

3. The chuck of claim 1, wherein said chamber of said bushing including an inner wall of said annular region has the same cross-section, aligned in the same angular relationship, as that of said non-circular ends of said shanks so as to receive said ends respectively therein.

4. The chuck of claim 3, wherein said cross-section is polygonal.

5. The chuck of claim 1, wherein said bushing forms a recess, said recess opens into said chamber, said wing is disposed in said recess and has a surface enclosing a lateral side of said chamber defining in part with said chamber said cross-section of said chamber and engaging a corresponding side of a respective of said non-circular ends of said shanks inserted in said chamber.

6. The chuck of claim 1, wherein said sleeve is rotatable relative to said wing and said bushing.

7. The chuck of claim 1, wherein said bushing and said wing have curved outer walls, said wing forms a segment of a circle in cross-section, said outer walls form a complete circle in cross-section.

8. The chuck of claim 1, wherein said bushing forms a recess, said recess opens into said chamber, said wing is disposed in said recess, said annular region of said bushing closes said recess under said wing.

9. The chuck of claim 1, wherein said ball has a diameter greater than a thickness of said wing in a radial direction with respect to said bushing.

10. The chuck of claim 1, wherein said wing displaceably engages said bushing.

11. A chuck for non-circular ends of tool shanks, particularly screwdriver bits, comprising a bushing, said bushing forming a chamber corresponding in cross-section to that of said non-circular ends of the tool shanks respectively removably insertable therein, said bushing having a free end having an edge, a spring-biased sleeve displaceably mounted on said bushing in a direction of insertion of said shanks against spring-action for movement into a release position, a wing, a ball mounted in said wing, said free end of said bushing on a side of the wing opposite said sleeve forms an annular region of continuous cross-section, an end ring attached to said bushing surrounding said edge of said bushing, said wing, and said annular region, said end ring has an inner wall and a clamping surface which narrows down in wedge-shape towards said free end of the bushing on the inner wall of said ring, said ball operatively engaging said clamping surface and a respective of said shanks inserted in said chamber in a clamping position, said wing and said sleeve are two separate parts, said sleeve has an inwardly directed shoulder, said wing has an outwardly directed tang, said tang engageable over said shoulder, and a spring mounted in said bushing, said spring is partly supported by said tang.

12. The chuck of claim 11, wherein said spring is partly supported by said sleeve.

13. The chuck of claim 11, wherein said tang is spaced from said shoulder in said clamping position.

14. The chuck of claim 11, wherein said wing is partially a cylindrical segment in cross-section.

15. A chuck for non-circular ends of tool shanks, particularly screwdriver bits, comprising a bushing, said bushing forming a chamber corresponding in cross-section to that of said non-circular ends of the tool shanks respectively removably insertable therein, said bushing having a free end having an edge, a spring-biased sleeve displaceably mounted on said bushing in a direction of insertion of said shanks against spring-action for movement into a release position, a wing operatively engageable with said sleeve so as to be displaced into the release position, a ball mounted in said wing, said free end of said bushing on a side of the wing opposite said sleeve forms an annular region of continuous cross-section, an end ring attached to said bushing surrounding said edge of said bushing, said wing, and said annular region, said end ring has an inner wall and a clamping surface which narrows down in wedge-shape towards said free end of the bushing on the inner wall of said ring, said ball operatively engaging said clamping surface and a respective of said shanks inserted in said chamber in a clamping position, said wing and said sleeve are two separate parts, said sleeve is rotatable relative to said wing and said bushing, said wing and said bushing are rotationally immovable relative to each other, and said wing is longitudinally displaceable relative to said bushing.

16. A chuck for non-circular ends of tool shanks, particularly screwdriver bits, comprising a bushing, said bushing forming a chamber corresponding in cross-section to that of said non-circular ends of the tool shanks respectively removably insertable therein, said bushing having a free end having an edge, a spring-biased sleeve displaceably mounted on said bushing in a direction of insertion of said shanks against spring-action for movement into a release position, a wing operatively engageable with said sleeve so as to be moved into the release position, a ball mounted in said wing, said free end of said bushing on a side of the wing opposite said sleeve forms an annular region of continuous cross-section, an end ring surrounding said edge of said bushing, said wing, and said annular region, said end ring has an inner wall and a clamping surface which narrows down in wedge-shape towards said free end of the bushing on the inner wall of said ring, said ball operatively engaging said clamping surface and a respective of said shanks inserted in said chamber in a clamping position, said wing and said sleeve are two separate parts, and said end ring is rigidly connected to said bushing at said annular region.

17. A chuck for non-circular ends of tool shanks, particularly screwdriver bits, comprising a bushing, said bushing forming a chamber corresponding in cross-section to that of said non-circular ends of the tool shanks respectively removably insertable therein, said bushing having a free end having an edge, a spring-biased sleeve displaceably mounted on said bushing in a direction of insertion of said shanks against spring-action for movement into a release position, a wing operatively engageable with said sleeve so as to be moved into the release position, a ball mounted in said wing, said free end of said bushing on a side of the wing opposite said sleeve forms an annular region of continuous cross-section, an end ring attached to said bushing surrounding said edge of said bushing, said wing, and said annular region, said end ring has an inner wall and a clamping surface which narrows down in wedge-shape towards said free end of the bushing on the inner wall of said ring, said ball operatively engaging said clamping surface and a respective of said shanks inserted in said chamber in a clamping position, said wing and said sleeve are two separate parts, a spring acting against said sleeve and said wing for displacing said sleeve and said wing into the clamping position with said ball pressing against said respective shank and said clamping surface, and said sleeve engages said end ring in said clamping position and is longitudinal spaced apart from said end ring in said release position.

18. A chuck for non-circular ends of tool shanks, particularly screwdriver bits, comprising a bushing having a chamber corresponding to said non-circular ends for releasably insertion of said shanks respectively therein, a wing having a ball-receiving cavity, an end ring having a clamping surface which narrows down in wedge-shape towards a shank inserting end of the bushing, said clamping surface being defined on an inner wall of said end ring, said inner wall surrounding an edge of said bushing and said wing, said end ring is attached to said bushing, a ball cooperating with said cavity of said wing, a sleeve turntable relative to said bushing, spring means longitudinally displacing said sleeve and said wing into a clamping position with said ball pressing against a respective of said shanks and said clamping surface, and said sleeve being longitudinally displaceable and operatively engageable with said wing so as to displace said ball to a wider portion of said clamping surface in a direction of insertion of said shanks against said spring means for movement into a release position, and said bushing on a side of said wing away from said sleeve forms an annular region of continuous cross-section, said region being surrounded by said end ring.

19. A chuck for non-circular ends of tool shanks, particularly screwdriver bits, comprising a bushing, said bushing forming a chamber corresponding in cross-section to that of said non-circular ends of the tool shanks respectively removably insertable therein, said bushing having a free end having an edge, a spring-biased sleeve displaceably mounted on said bushing in a direction of insertion of said shanks against spring-action for movement into a release position, a wing operatively engageable with said sleeve and displaceably mounted with respect to said bushing so as to be movable in the direction of insertion of said shanks against the spring-action for movement into the release position, a ball mounted in said wing, said free end of said bushing on a side of the wing opposite said sleeve forms an annular region of continuous cross-section, an end ring attached to said bushing surrounding said edge of said bushing, said wing, and said annular region, said end ring has an inner wall and a clamping surface which narrows down in wedge-shape towards said free end of the bushing on the inner wall of said ring, said ball operatively engaging said clamping surface and a respective of said shanks inserted in said chamber in a clamping position.

20. The chuck of claim 19, wherein said sleeve is rotatable relative to said wing and said bushing.

* * * * *